United States Patent
Natale et al.

(10) Patent No.: US 6,362,259 B1
(45) Date of Patent: *Mar. 26, 2002

(54) STABILIZATION OF AQUEOUS EMULSION POLYMERS

(75) Inventors: Marcie Natale, Plymouth Meeting; Rudolph Klima, Lansdale; Thomas Hopkins, Chalfont; Michael Wiggins, Lansdale, all of PA (US)

(73) Assignee: Cognis Corporation, Gulph Mills, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/363,555

(22) Filed: Jul. 29, 1999

(51) Int. Cl.[7] ............... C08K 5/06; C08K 5/1515
(52) U.S. Cl. ............ 524/114; 524/376; 524/377; 524/804; 526/910; 526/911; 526/932
(58) Field of Search .................. 524/377, 378, 524/376, 457, 804, 832, 114; 526/910, 911, 932

(56) References Cited

U.S. PATENT DOCUMENTS

| | | | | |
|---|---|---|---|---|
| 3,102,893 A | * | 9/1963 | Gaertner | 260/348 |
| 3,623,988 A | * | 11/1971 | Weilmer | 252/89 |
| 4,014,843 A | * | 3/1977 | Xanthopoulo | 260/29.7 T |
| 5,008,321 A | * | 4/1991 | Hartmann et al. | 524/378 |
| 5,292,800 A | * | 3/1994 | Moench et al. | 524/801 |
| 5,827,453 A | | 10/1998 | Gross et al. | |
| 5,895,605 A | | 4/1999 | Gross et al. | |
| 6,110,977 A | | 8/2000 | Gross et al. | |

* cited by examiner

Primary Examiner—David W. Wu
Assistant Examiner—Kelechi C. Egwim
(74) Attorney, Agent, or Firm—John E. Drach; Henry E. Millson, Jr.

(57) ABSTRACT

Aqueous emulsion polymer compositions stabilized with the reaction product of alkoxylated alcohols and an epihalohydrin or a trihaloalkanes.

12 Claims, 2 Drawing Sheets

STABILIZATION OF AQUEOUS EMULSION POLYMERS

FIELD OF THE INVENTION

This invention relates to emulsifiers to stabilize emulsion polymer latex compositions.

BACKGROUND OF THE INVENTION

Aqueous emulsion polymers are typically prepared and stabilized with various emulsifiers, such as surfactants.

However, surfactants vary in their ability to stabilize such emulsions, and more efficient stabilizing agents are always in demand.

SUMMARY OF THE INVENTION

It has now been discovered that the branched products of the reaction of
A) at least one compound of formula I

$$R^1(X)_3 \tag{I}$$

wherein each X group is a halogen atom or one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and
B) at least one compound having the formula II

$$R(OE)_n(OP)_m\text{—OH} \tag{II}$$

wherein R is a substituted or unsubstituted, saturated or unsaturated aliphatic group having from 3 to 22 carbon atoms, n is a number of from 1 to 50, preferably from 3 to 50, and m is a number from 0 to 10; wherein the mole ratio of component A) to component B) is from about 0.60/1 to about 2/1, preferably from about 0.80/1 to about 2/1, are extremely efficient and effective emulsifiers for aqueous emulsion polymers, especially vinyl acrylic emulsion polymer systems.

DETAILED DESCRIPTION OF THE INVENTION

Figure 1:
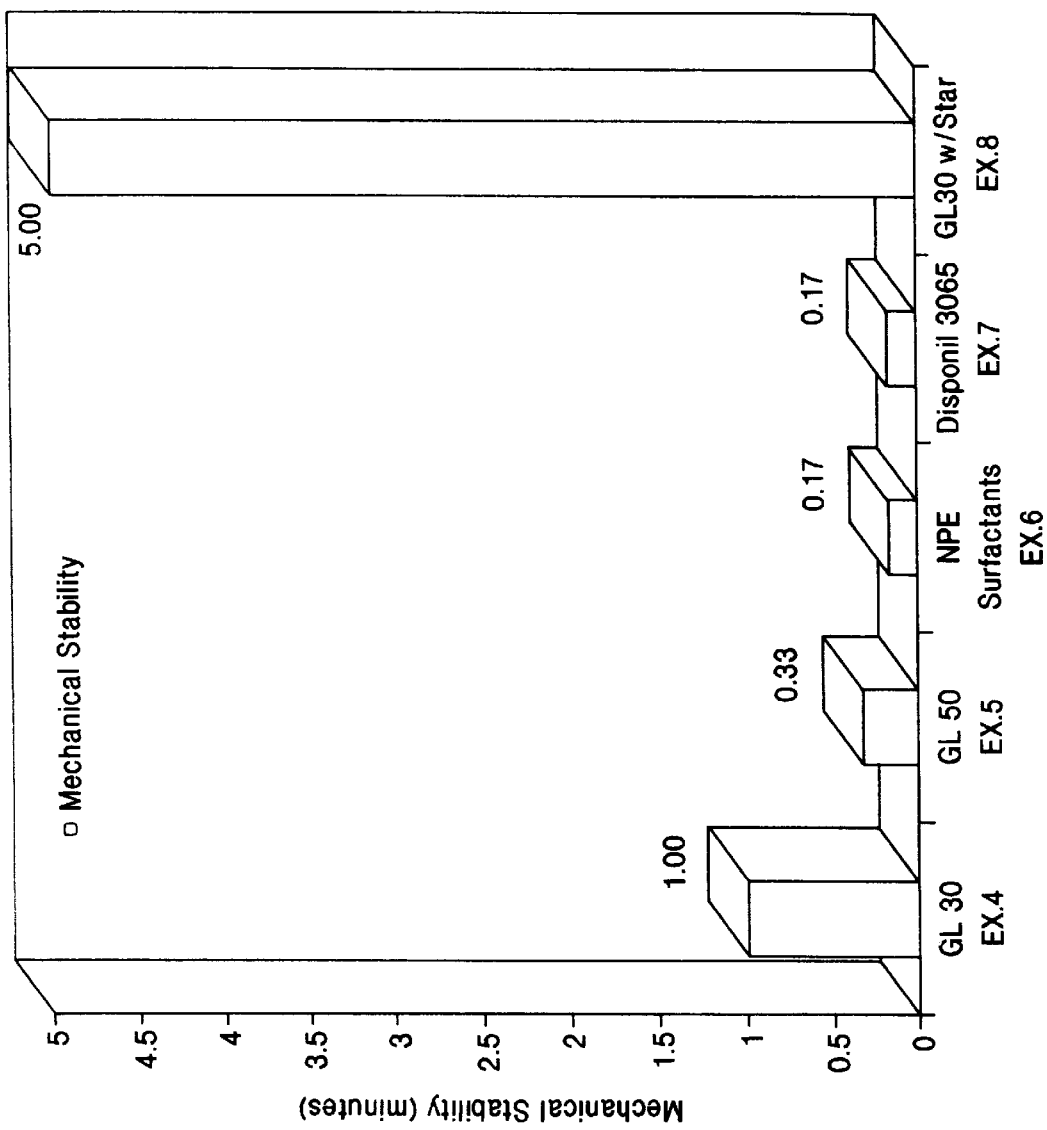
FIG. 1 shows the mechanical stability of a vinyl acrylic latex prepared with a stabilizing agent of the invention compared to vinyl acrylic latexes prepared with other stabilizing agents.

Other than in the operating examples, or where otherwise indicated, all numbers expressing quantities of ingredients or reaction conditions used herein are to be understood as modified in all instances by the term "about".

This invention relates to aqueous polymers containing a stabilizing-effective quantity of the reaction product of components A) and B) above, to a method for stabilizing aqueous emulsion polymers by adding thereto a stabilizing-effective quantity of this reaction product, either during the emulsion polymerization process or after formation of the emulsion polymer, and to finished compositions such as hydrophilic latex paints containing the stabilized aqueous emulsion polymers of the invention.

The compound of formula I of component A) is preferably epichlorohydrin although other epihalohydrins can be used. Also, trihaloalkanes can be used, such as 1,2,3-trichloropropane, 1,2,4-trichlorobutane, 1,3,6-trichlorohexane, and the like. Instead of chlorine in the epihalohydrins and the trihaloalkanes, the corresponding bromine and iodine compounds can also be used, including compounds containing two or even all three of these halogens.

With respect to the alkoxylates of formula II (component B), R can be any substituted or unsubstituted, saturated or unsaturated aliphatic moiety having from 3 to 22 carbon atoms. Thus, R can be a linear or branched alkyl group, a linear or branched alkenyl or alkynyl group, a saturated carbocyclic moiety, an unsaturated carbocyclic moiety having one or more multiple bonds, a saturated heterocyclic moiety, an unsaturated heterocyclic moiety having one or more multiple bonds, a substituted linear or branched alkyl group, a substituted linear or branched alkenyl or alkynyl group, a substituted saturated carbocyclic moiety, a substituted unsaturated carbocyclic moiety having one or more multiple bonds, a substituted saturated heterocyclic moiety, a substituted unsaturated heterocyclic moiety having one or more multiple bonds. Examples of the above include but are not limited to an alkyl group having from 3 to 22 carbon atoms, an alkenyl group having from 3 to 22 carbon atoms, and an alkynyl group having from 3 to 22 carbon atoms. R can also be an arenyl group. Arenyl groups are alkyl-substituted aromatic radicals having a free valence at an alkyl carbon atom such as a benzylic group. The preferred value of R is an alkyl group having from 3 to 22 carbon atoms and most preferably an alkyl group having from 8 to 10 carbon atoms. The degree of ethoxylation is preferably from 2 to about 50 with the most preferred being from 3 to about 50 while the degree of propoxylation can vary from 0 to 10 and is preferably 0. However, the degree of propoxylation will be determined by the desired degree of water solubility or miscibility. The water solubility or miscibility will ultimately be determined by such factors as the number of carbon atoms in R, the relative amounts of OE and OP and the effect of OP on the biodegradability of the final polymeric reaction product. The water solubility or miscibility of a reaction product according to the invention and the interrelationships between the number of carbon atoms in R, the relative amounts of OE and OP and the boidegradability of the final product can be readily determined by one of ordinary skill in the art.

The polymeric reaction product of components A) and B) will preferably have a degree of polymerization of from 2.0 to 6.0.

It is critical that the mole ratio of component A) to component B) not be less than 0.60/1 since lower ratios will not provide the degree of branching necessary for obtaining the effectiveness of the reaction products as stabilizing agents for the aqueous emulsion polymers.

The reaction between components A) and B) is preferably carried out using the following reaction sequence:
a) component B) is heated in the presence of an organic solvent that will azeotrope water, e.g. benzene, toluene, or xylene and in the presence of from 1 to 1.5 equivalents, based on OH groups, of an alkali metal hydroxide, preferably aqueous concentrated sodium hydroxide, under reflux conditions, preferably at atmospheric pressure, to remove water of reaction and any water introduced with the alkali metal hydroxide through azeotropic distillation. The reflux temperature is of course dependent on the organic solvent used in this step. The reaction is continued until substantially all of the water in the reaction mixture is removed, e.g. to a residual water content of 0.2% by weight or less. The reaction mixture is then preferably cooled.

b) component A) is then slowly added to the reaction mixture from step a) and reacted at a temperature of from 60° C. to the reflux temperature of the organic solvent, preferably at a temperature of from 100 to 110° C.

c) the organic solvent is then removed from the reaction mixture resulting from step b), preferably by vacuum distillation.

d) water can then be added to the reaction product from step c) if desired to form an aqueous solution having a solids content of from 15 to 40% by weighty preferably from 20 to 40% by weight.

The invention also relates to aqueous emulsion polymers prepared with and stabilized with the reaction products of the invention, optionally with other nonionic surfactants, anionic surfactants, cationic surfactants, or mixtures thereof.

The reaction products of the invention, with or without other surfactants, can be incorporated into emulsion polymerization compositions at the beginning of the polymerization reaction, or added to emulsion polymers at the end of the reaction. They can be used in the emulsion polymerization to form a wide variety of latexes, e.g. in the emulsion polymerization of esters and/or amides of acrylic and/or methacrylic acid. Thus, the compounds can be used in the polymerization of the methyl, ethyl, propyl, isopropyl, butyl, hexyl and/or 2-ethylhexyl esters of acrylic acid and/or methacrylic add. The emulsifiers can also be used in the emulsion polymerization of N-alkylamides of acrylic and/or methacrylic acid.

They can also be used in the emulsion polymerization of vinyl esters. Suitable vinyl esters are vinyl acetate, vinyl propionate, vinyl-2-hexyl hexanate and also higher esters of vinyl alcohol. The emulsifiers are also suitable for use in the polymerization of vinyl halides, preferably vinyl chloride or vinylidene chloride.

They can also be used in the emulsion polymerization of olefins. Suitable olefins are, for example, styrene or other aromatic vinyl compounds, such as α-methyl styrene or isobutene. They can also be used in the emulsion polymerization of diolefins, for example in the production of rubber lattices in the broadest sense, i.e. those based on butadiene, isoprene, chlorinated butadienes, chlorinated isoprenes or on copolymers of diolefins with styrene and/or acrylonitrile.

They can also be used in the copolymerization of at least one of the above-mentioned monomers with other, optionally partially water-soluble, monomers. Thus, they are suitable for use in the copolymerization of ethylenically unsaturated monomers with acrylonitrile, methacrylonitrile, maleates or fumarates, for example di-n-butyl maleate or monobutyl maleate.

Finally, they are also suitable for use in the emulsion polymerization of mixtures of different monomers, for example mixtures of acrylates with styrene, ethylene with vinyl acetate or vinyl chloride with vinyl acetate and mixtures of vinyl acetate with long-chain vinyl esters, for example versatic acid vinyl ester. Water-insoluble monomers can be selected from vinyl acetate, butyl acrylate, styrene, butadiene, methylmethacrylate, methylacrylate, chloroprene, vinyl chloride, acrylonitrile, acrylamide, ethylene, ethyl acrylate, vinyl versatate, maleic anhydride 2-ethyl hexyl acrylate and mixtures thereof.

Also, within the scope of the invention they can also be used in the copolymerization of ethylenically unsaturated, water-insoluble monomers with dissociable, water-soluble monomers, the dissociable, water-soluble monomers making up less than 40% by weight and preferably from 0.5 to 15% by weight of the monomer total.

Suitable water-soluble, dissociable monomers are acrylic acid, methacrylic acid, itaconic acid, maleic acid, fumaric acid, semiesters of maleic acid or fumaric acids, crotonic acid, vinyl sulfonic acid, vinyl phosphonic acid and/or 2-acrylamino-2-methylpropane sulfonic acid. The acids are preferably used in the form of salts, for example alkali metal salts or ammonium salts. Other suitable comonomers area basic esters of acrylic and/or methacrylic acid, for example dimethylaminoethyl methacrylate.

As stated above, the emulsifiers (reaction products) of the invention can optionally be used in combination with anionic surfactants, cationic surfactants, other nonionic surfactants, or mixtures of the foregoing.

The nonionic surfactants can be alkyl polyglycoside nonionic surfactants, i.e. compounds of the formula

$$R^1O(R^2O)_b(Z)_a$$

wherein $R^1$ is a monovalent organic group having from about 6 to about 30 carbon atoms, $R^2$ is a divalent alkylene group having form 2 to 4 carbon atoms, Z is a saccharide residue having 5 to 6 carbon atoms, b is a number of from 1 to about 12, and a is a number of from 1 to about 6. Alkyl polyglycosides in which Z is a glucose and b is zero are preferred.

Such alkyl polyglycosides are commercially available, for example, as APG®, GLUCOPON®, or PLANTAREN® surfactants from Henkel Corporation, Ambler, Pa. 19002. Examples of such surfactants include but are not limited to:

1. APG® 225 Surfactant—an alkyl polyglycoside in which the alkyl group contains 8 to 10 carbon atoms and having an average degree of polymerization of 1.7.
2. APG® 425 Surfactant—an alkyl polyglycoside in which the alkyl group contains 8 to 18 carbon atoms and having an average degree of polymerization of 1.5.
3. APG® 625 Surfactant—an alkyl polyglycoside in which the alkyl group contains 12 to 16 carbon atoms and having an average degree of polymerization of 1.6.
4. APG® 325 Surfactant—an alkyl polyglycoside in which the alkyl group contains 9 to 11 carbon atoms and having an average degree of polymerization of 1.5.
5. GLUCOPON® 600 Surfactant—an alkyl polyglycoside in which the alkyl group contains 12 to 16 carbon atoms and having an average degree of polymerization of 1.4.
6. PLANTAREN® 2000 Surfactant—a C8–16 alkyl polyglycoside in which the alkyl group contains 8 to 16 carbon atoms and having an average degree of polymerization of 1.5.
7. PLANTAREN® 1300 Surfactant—a C12–16 alkyl polyglycoside in which the alkyl group contains 12 to 16 carbon atoms and having an average degree of polymerization of 1.6.
8. GLUCOPEN® 220 Surfactant—an alkyl polyglycoside in which the alkyl group contains 8 to 10 carbon atoms and having an average degree of polymerization of 1.5.

Other examples include alkyl polyglycoside surfactant compositions which are comprised of mixtures of compounds of formula 1 wherein Z represents a moiety derived from a reducing saccharide containing 5 or 6 carbon atoms; a is a number having a value from 1 to about 6; b is zero; and $R^1$ is an alkyl radical having from 8 to 20 carbon atoms. The compositions are characterized in that they have increased surfactant properties and an HLB in the range of about 10 to about 16 and a non-Flory distribution of glycosides, which is comprised of a mixture of an alkyl monoglycoside and a mixture of alkyl polyglycosides having varying degrees of polymerization of 2 and higher in progressively decreasing amounts, in which the amount by weight of polyglycoside having a degree of polymerization of 2, or mixtures thereof with the polyglycoside having a degree of polymerization of 3, predominate in relation to the amount of monoglycoside, said composition having an average degree of polymerization of about 1.8 to about 3. Such compositions, also known as peaked alkyl polyglycosides, can be prepared by separation of the monoglycoside from the original reaction mixture of alkyl monoglycoside and alkyl polyglycosides after removal of the alcohol. This separation may be carried out by molecular distillation and normally results in the removal of about 70–95% by weight of the alkyl monoglycosides. After removal of the alkyl monoglycosides, the relative distribution of the various components, mono- and polyglycosides, in the resulting product changes and the concentration in the product of the polyglycosides relative to the monoglycoside increases as well as the concentration of individual polyglycosides to the total, i.e. DP2 and DP3 fractions in relation to the sum of all DP fractions. Such compositions are disclosed in U.S. Pat. No. 5,266,690, the entire contents of which are incorporated herein by reference.

The nonionic surfactants can also be the condensation product of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a nonionic detergent. Further, the length of the polyethyleneoxy chain can be adjusted to achieve the desired balance between the hydrophobic and hydrophilic elements.

The nonionic surfactants include the polyethylene oxide condensate of one mole of alkyl phenol containing from about 6 to 12 carbon atoms in a straight- or branched-chain configuration with about 5 to 30 moles of ethylene oxide, e.g., nonyl phenol condensed with 9 moles of ethylene oxide, dodecyl phenol condensed with 15 moles of ethylene oxide and dinonyl phenol condensed with 15 moles of ethylene oxide. Condensation products of the corresponding alkyl thiophenols with 5 to 30 moles of ethylene oxide are also suitable.

Still other suitable nonionics are the polyoxyethylene polyoxypropylene adducts of I-butanol. The hydrophobe of these nonionics has a minimum molecular weight of 1,000 and consists of an aliphatic monohydric alcohol containing from 1 to 8 carbon atoms to which is attached a chain of oxethylene and oxypropylene. The weigh ratio of oxypropylene to oxyethylene covers the range of 95:5 to 85:15. Attached to this is the hydrophilic polyoxyethylene chain which is from 44.4 to 54.6 percent of the total molecular weight of 1,400 to 4,000.

Other suitable nonionics may be derived by the condensation of ethylene oxide with the product resulting from the reaction of propylene oxide and ethylene diamine. The molecular weight varies from 500 to 4,500 or more.

Nonionic surfactants can also be the aliphatic alkoxylated alcohols of formula III below.

$$R^2(OA)_nOH \qquad (III)$$

wherein $R^2$ is an aliphatic group containing from 4 to 36 carbon atoms, n is a number of from 1 to 200, and each OA group is independently an ethyleneoxy, 1,2-propyleneoxy, or 1,2-butyleneoxy group. The $R^2$ group is preferably a straight or branched chain alkyl group containing from 8 to 20 carbon atoms, more preferably from 9 to 20 carbon atoms. However, the $R^2$ group can also be a linear or branched alkenyl or alkynyl group, a saturated carbocyclic moiety, an unsaturated carbocyclic moiety having one or more multiple bonds, a saturated heterocyclic moiety, or an unsaturated heterocyclic moiety having one or more multiple bonds. The number of alkoxy groups, i.e. the value of n in formula III, is preferably form 20 to 120, and more preferably from 40 to 100. The OA groups are preferably all ethyleneoxy groups.

The nonionic surfactants preferred for use herein are the aliphatic alkoxylated alcohols of formula III above, and the alkyl polyglycoside surfactants described above.

The anionic surfactants that can be present include those surface active compounds which contain an organic hydrophobic group containing generally 8 to 26 carbon atoms and preferably 10 to 18 carbon atoms in their molecular structure, and at least one water-solubilizing group selected from the group of sulfonate, sulfate, carboxylate, phosphonate and phosphate so as to form a water-soluble surfactant.

Examples of suitable anionic surfactants include the water-soluble salts, e.g. the sodium, ammonium, and alkanol ammonium salts, of higher fatty acids or resin salts containing about 8 to 20 carbon atoms, preferably 10 to 18 carbon atoms. Suitable fatty acids can be obtained from oils and waxes of animal or vegetable origin, e.g., tallow, grease, coconut oil, tall oil and mixtures thereof. Particularly useful are the sodium and potassium salts of the fatty acid mixtures derived from coconut oil and tallow, e.g., sodium coconut soap and potassium tallow soap.

The anionic su s also include the water-soluble sulfated and sulfonated synthetic surfactants having an alkyl radical of 8 to 26, and preferably 12 to 22 carbon atoms, in their molecular structure, such as sodium lauryl sulfate and $C_{12-14}$ fatty alcohol ether sulfates.

Suitable anionic surfactants also include $C_8$–$C_{18}$ acyl sarcosinates (e.g. sodium lauroyl sarcosinate), sodium and potassium salts of the reaction product of higher fatty acids containing 8–18 carbon atoms in the molecule esterified with isethionic acid, and sodium and potassium salts of the $C_8$–$C_{18}$ acyl N-methyl taurides, e.g., sodium cocoyl methyl taurate and potassium stearoyl methyl taurate.

Anionic phosphate surfactants in which the anionic solubilizing group is an oxyacid of phosphorous are also useful in the present mixtures. Suitable phosphate surfactants are the sodium, potassium and ammonium alkyl phosphate esters. The compounds famed by including one to 40 moles of ethylene oxide in the foregoing esters are also satisfactory.

Cationic surfactants that can be used herein include fatty amine hydrochlorides and quaternary ammonium compounds.

The reaction products of the invention are present in the emulsion polymer reaction mixtures or in the emulsion polymer reaction product in a stabilizing quantity, e.g. from 0.1 to 5.0% by weight, based on solids.

When other emulsifiers such as the above surfactants are also present, it is preferred to use these other emulsifiers in quantities of from 10 to 80% by weight and preferably in quantities of from 20 to 50% by weight, based on the reaction products.

With the reaction product emulsifiers present in the emulsion polymer reaction mixtures in accordance with the invention, the emulsion polymerization can be carried out at the usual temperatures, for example at temperatures in the range of from 0 to 120° C. and preferably at temperatures in the range of from 40 to 100° C. and under normal pressure or, in the case of gaseous monomers, even under elevated pressure. The various methods of addition known by those skilled in the art of polymerization can be used. Thus, an emulsion can be prepared in the reaction vessel and then polymerized or, if desired, the monomers, auxiliaries or even more emulsion can be added continuously or in batches during the reaction.

Standard auxiliaries may be used together with the reaction product emulsifiers in the emulsion polymerization processes. Such auxiliaries include, for example, polymerization initiators and/or accelerators, such as for example potassium or ammonium persulfate, hydrogen peroxide, reducing agents, such as salts of sulfurous acid or of dithionic acid, transition metal compounds and the like. By virtue of the comparatively low stability of the alkyl glycosides at pH values above 7, it is preferred to use buffers, such as sodium hydrogen carbonate or sodium pyrophosphate, ammonium acetate or sodium acetate as further auxiliaries.

It is also possible to use molecular weight regulators such as, for example, organic sulfur compounds, including mercaptoethanol, thioglycolic acid or thioglycolic acid esters with polyhydric alcohols, such as ethylene glycol or glycerol.

The invention also relates to finished compositions such as latex paints containing the stabilized emulsion polymer compositions of the invention.

Latex paints of the invention contain the stabilized emulsion polymer compositions of the invention plus other components standard for finished aqueous-based paint compositions, such as pigments and colorants, thickening agents, defoamers, flow agents, catalysts, wetting agents, and plasticizers.

The invention will be illustrated but not limited by the following examples. In the following examples the designation "EO" means ethyleneoxy.

EXAMPLE 1

About 150 grams of decyl alcohol ethyoxylated with an average of 4 moles of ethylene oxide (0.45 OH equivalents) were mixed with 385 grams of toluene and 54 grams of 50% aq. NaOH (0.675 equivalents). The water was removed by azeotropic distillation and when a moisture level of less than 0.8% was reached, about 46 grams (0.51 equivalents) of epichlorohydrin were slowly added. This mixture was allowed to react at 100–110° C. for 24 hours. An aliquot of this mixture was removed and filtered to remove the NaCl and vacuum stripped to remove the toluene to give an amber, easily pourable liquid product that was dispersible in water.

EXAMPLE 2

About 51 grams of butanol ethyoxylated with an average of 2 moles of ethylene oxide (0.32 OH equivalents) were mixed with 120 grams of toluene and 25 grams of 50% aq. NaOH (0.32 equivalents). The water was removed by azeotropic distillation and when a moisture level of less than 0.8% was reached, about 46 grams (0.24 equivalents) of epichlorohydrin were slowly added. This mixture was allowed to react at 100–110° C. for 24 hours. An aliquot of this mixture was removed and filtered to remove the NaCl and vacuum stripped to remove the toluene to give an amber, easily pourable liquid product that was dispersible in water.

EXAMPLE 3

About 200.0 grams (0.654 hydroxyl equivalents) of octyl alcohol ethyoxylated with an average of 4 moles of ethylene oxide was mixed with 400 grams of toluene and 78.4 grams (0.98 equivalents) of 50% NaOH. Water was removed by azeotropic distillation until the level was below 0.8%. The mixture was cooled to 80° C. and 67.2 grams (0.72 moles) of epichlorohydrin was added over 45 minutes. The mixture was stirred for 24 hours at 110° C. until the epoxy titration showed no epoxide left. The material was cooled, filtered and the toluene was removed by vacuum distillation leaving a dark brown low viscosity liquid.

EXAMPLE 4

A vinyl acrylic latex was made using the following recipe.

| Formulation sheet for Vinyl Acetate/ Butyl Acrylate Latex | Weight (grams) |
|---|---|
| Premix of monomers | |
| Material | |
| Total weight monomers (grams) = | 270 |
| Monomer 1 (Vinyl Acetate) = | 229.5 |
| Monomer 2 (Butyl Acrylate) = | 40.5 |
| First Charge | |
| Water | 249.3 |
| GL 30 (65% active blend of dodecyl alcoyol.30E0 (15%) and GLUCOPON ® 220 *(50%) | 8.1 |
| Sodium Lauryl Sulfate | 2.7 |
| Sodium Persulfate | 1.01 |
| Sodium Bicarbonate | 0.5 |
| $FeCl_3$ (trace) | 0.01 |
| Adjust pH with 85% phos. acid | 3.5 |
| Sparge into liquid with N2 until T = 55° C. | |
| Adjust heater | |
| Stir at 150 rpm | |
| Record start time | |
| Second Charge | |
| When T = 55° C. | |
| Add 10% of monomer mix with eye dropper | |
| Keep T < 60° C. | |
| Allow to mix about 5 minutes | |
| Clean pump with isopropyl alcohol then water | |
| Third Charge | |
| Make reducer | |
| SFS (Sodium Formaldehyde Sulfoxylate) | 0.5 |
| 30% $NH_4OH$ | 0.5 |
| Water | 50 |
| Add 1 ml by dropper | |
| Add to reactor via dropping funnel (slow drops) 12 drops per minute | |
| Record time | |
| Fourth Charge | |
| Pump remaining monomer | |
| Mix in @ 1 gram per minute (3 hours) | |
| Pump gauge = 40 | |
| Allow to mix 30 minutes after all monomer added while dropping SFS solution. | |
| Fifth Charge | |
| Make TBHP (tributylhydroperoxide) solution: | |
| If 70% liquid dilute 1.4 grams TBHP to 100 grams | |
| Otherwise if solid: THBP Solid | 1 |
| Water | 10 |
| Add few drops to flask | |
| Monitor temperature | |
| If T increases run reaction 15 minutes | |
| Add again check T | |
| If T constant start cool down | |
| USE UP ALL MONOMER | |
| % Solids = | 49 |

| Formulation sheet for Vinyl Acetate/ Butyl Acrylate Latex | Weight (grams) |
|---|---|

*GLUCOPON® 220 is an alkyl polyglycoside in which the alkyl group contains 8 to 10 carbon atoms and having an average degree of polymerization of 1.5.

EXAMPLE 5

A vinyl acrylic latex was prepared according to the process of Example 4 except that in the First Charge 4.0 grams of GL 50 was used instead of GL 30 and 1.3 grams of sodium lauryl sulfate instead of 2.7 grams. GL 50 is 65% active blend of dodecyl alcohol •50EO (15%) and GLUCOPON® 220 (50%).

EXAMPLE 6

A vinyl acrylic latex was prepared according to the process of Example 4 except that 5.4 grams of NPE surfactants was used instead of GL 30. NPE surfactants is a blend containing 75% by weight of nonyl phenol •40EO (70% active) and 25% by weight of sodium lauryl sulfate (28% active).

EXAMPLE 7

A vinyl acrylic latex was prepared according to the process of Example 4 except that 4.0 grams of DISPONIL™ 3065 was used instead of GL 30, and 1.3 grams of sodium lauryl sulfate was used instead of 2.7 grams of DISPONIL™ 3065 is a 65% active blend of dodecyl alcohol •30EO (45.5%) and alkyl polyglycol ether (APC® 110) (19.5%).

EXAMPLE 8

A vinyl acrylic latex was prepared according to the process of Example 4 except that 8.1 grams of a blend of GL 30 (83.33%) and the reaction product of Example 1 (16.67%) was used instead of GL 30.

EXAMPLE 9

The latexes of Example 4–8 were tested for their mechanical stability according to the following procedure:

Approximately 250 grams of latex was put in a Hamilton Beach Blender and blended (high shear) using the highest setting for a maximum of five minutes. The latex was blended until it coagulated. The time was measured from initial blending until coagulation. The latex passed the test if it did not coagulate after five minutes.

The results are set fort in FIG. 1. As can be seen from FIG. 1, none of the emulsifiers of Examples 47 were mechanically stable for more than 1 minute, while a blend containing a reaction product of the invention passed the test (stability for at least five minutes).

EXAMPLE 10

A vinyl acrylic latex was prepared according to the process of Example 4 except Fat 4.0 grams of a 65% active blend of dodecyl alcohol •30EO (10%) and GLUCOPON® 220 (55%), was used instead of GL 30. Also 1.3 grams of sodium lauryl sulfate was used. After the reaction was completed, 2.7 grams of the reaction product of Example 1 was added by stirring the latex slowly with a bench top mixer at 10 rpm while the reaction product was added dropwise. The latex was mixed for five minutes after the addition of the reaction product was completed, and equilibrated overnight.

The mechanical stability of the latex before the addition of the reaction product and after the addition of the reaction product were measured according to the procedure given in Example 9.

Figure 2:
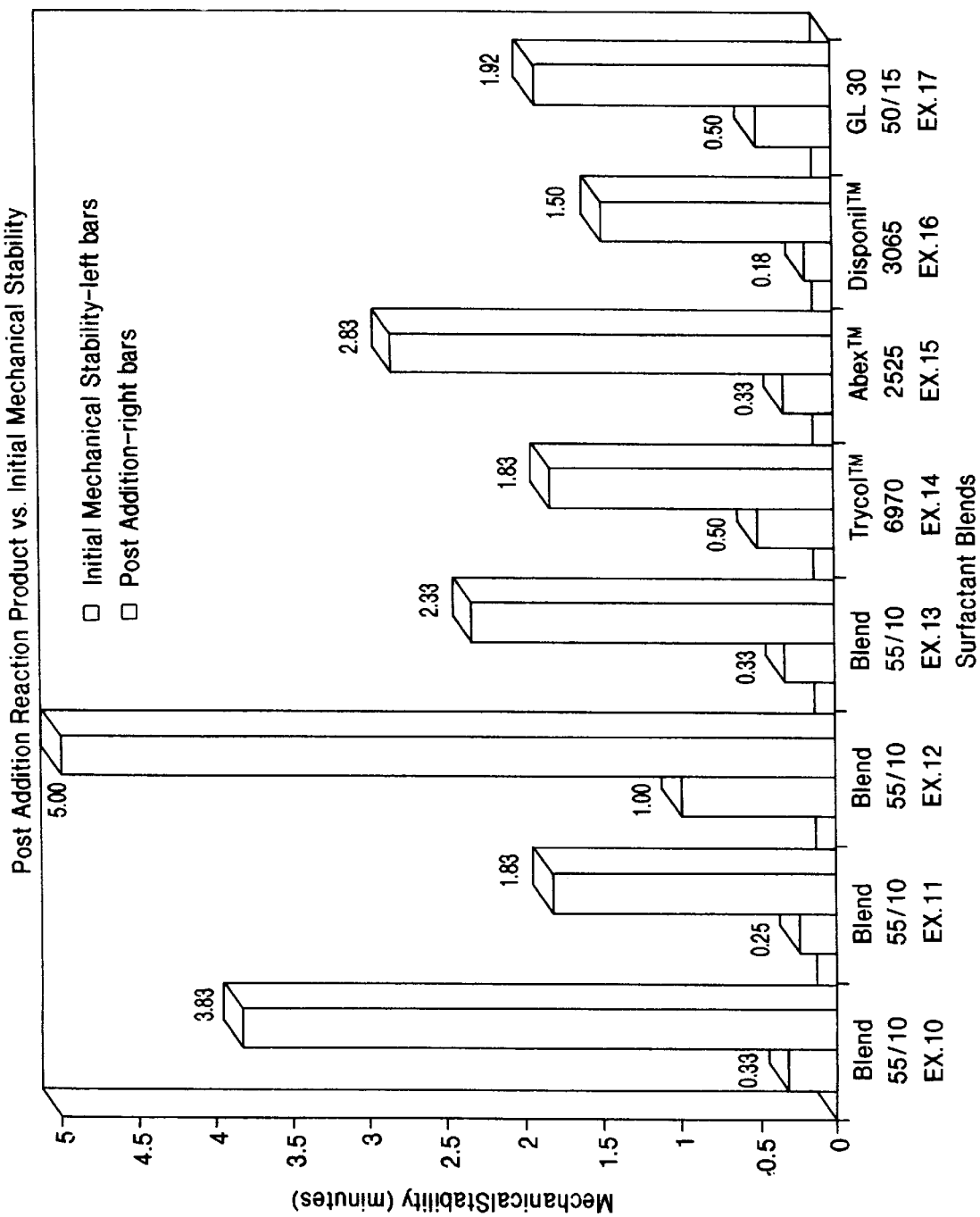
FIG. 2 shows the mechanical stability of vinyl acrylic latexes with stabilizing agents of the invention added after formation of the latexes.

The results are given in FIG. 2, first set of bars with the bar on the left being the initial mechanical stability and the bar on the right being the mechanical stability after the addition of the reaction product of Example 1.

EXAMPLE 11

A vinyl acrylic latex was prepared according to the process of Example 10 except that 5.4 grams of the blend were used, and 1.8 grams sodium lauryl sulfate.

The results of the mechanical stability tests are given in the second set of bars in FIG. 2.

EXAMPLE 12

A vinyl acrylic latex was prepared according to the process of Example 10 except that 8.1 grams of the blend were used, and 2.7 grams of sodium lauryl sulfate.

The results of the mechanical stability tests are given in the third set of bars in FIG. 2.

EXAMPLE 13

A vinyl acrylic latex was prepared according to the process of Example 10 except that 10.8 grams of the blend were used, and no sodium lauryl sulfate.

The results of the mechanical stability tests are given in the fourth set of bars in FIG. 2.

EXAMPLE 14

A vinyl acrylic latex was prepared according to the process of Example 12 except that 8.1 grams of TRYCOL™ 6970 were used instead of the blend. TRYCOL™ 6970 is nonyl phenol •40EO.

The results of the mechanical stability tests are given in the fifth set of bars in FIG. 2.

EXAMPLE 15

A vinyl acrylic latex was prepared according to the process of Example 10 except that 4.0 grams of ABEX™ 2525 was used instead of the blend. ABEX™ 2525 is believed to be mixed linear and branched alcohol ethoxylates.

The results of the mechanical stability tests are given in the sixth set of bars in FIG. 2.

EXAMPLE 16

A vinyl acrylic latex was prepared according to the process of Example 10 except that 4.0 grams of DISPONIL™ 3065 were used instead of the blend. DISPONIL™ 3065 is a 65% active blend of dodecyl alcohol •30EO (45.5%) and alkyl polyglycol ether (19.5%).

The results of the mechanical stability tests are given in the seventh set of bars in FIG. 2.

EXAMPLE 17

A vinyl acrylic latex was prepared according to the process of Example 10 except that 4.0 grams of GL 30 were used instead of the blend.

The results of the mechanical stability tests are given in the eighth set of bars in FIG. 2.

As can be been from FIG. 2, in every instance the addition of the reaction product of example 1 very significantly enhanced the mechanical stability of the latex.

What is claimed is:

1. An emulsion polymer composition containing an emulsion stabilizing effective quantity of product consisting essentially of the base catalyzed reaction of A) at least one which is an epihalohydrin B) at least one compound of formula II

$$R(OE)_n(OP)_m-OH \quad (II)$$

wherein R is a saturated or unsaturated organic group having from 3 to 22 carbon atoms. n is a number of from 1 to 50, m is a number from 0 to 10, EO represents an ethyleneoxy group, and OP represents a propyleneoxy group;
wherein the mole ration of components A) to component B) is from about 0.60:1 to about 2:1.

2. The emulsion polymer composition of claim 1 wherein said mole ratio is from about 0.8:1 to about 2:1.

3. The emulsion polymer composition of claim 1 wherein said stabilizing effective quantity is in the range of from about 0.1 to about 5.0% by weight, based on solids.

4. The emulsion polymer composition of claim 1 wherein component A) is epichlorohydrin.

5. The emulsion polymer composition of claim 1 which is a vinyl acrylic emulsion polymer composition.

6. The emulsion polymer composition of claim 1 wherein in said reaction product R in component B) is an alkyl group containing from 3 to 10 carbon atoms.

7. The emulsion polymer composition of claim 1 wherein in said reaction product n in component B) is from 3 to about 50 and m is zero.

8. The emulsion polymer composition of claim 1 wherein the composition also contains at least one other emulsifier.

9. The emulsion polymer composition of claim 1 wherein in component B), R is an alkyl group.

10. The emulsion polymer composition of claim 9 wherein the mole ration of component A) to component B) is from about 0.8:1 to about 2:1.

11. The emulsion polymer composition of claim 9 wherein the alkyl group contains from 8 to 10 carbon atoms.

12. The emulsion polymer composition of claim 9 wherein n is a number of from 3 to about 50.

* * * * *

UNITED STATES PATENT AND TRADEMARK OFFICE
CERTIFICATE OF CORRECTION

PATENT NO. : 6,362,259 B1
DATED : March 26, 2002
INVENTOR(S) : Natale et al.

Page 1 of 1

It is certified that error appears in the above-identified patent and that said Letters Patent is hereby corrected as shown below:

<u>Column 11,</u>
Line 7, cancel text beginning with "1. An emulsion polymer composition containing an emulsion" to ending "is from about 0.60:1 to about to about 2:1" in line 20, and insert the following:
1. An emulsion polymer composition containing an emulsion stabilizing effective quantity of a product consisting essentially of the base catalyzed reaction product of
    A)    at least one compound of formula I
$$R^1(X)_3 \qquad (I)$$
wherein one X group is a halogen atom and two X groups represent an epoxy oxygen atom, which is attached to two adjacent carbon atoms in the $R^1$ group to form an epoxy group, and $R^1$ is an alkanetriyl group containing from 3 to 10 carbon atoms; and
    B)    at least one compound of formula II
$$R(OE)_n(OP)_m\text{-OH} \qquad (II)$$
wherein R is a saturated or unsaturated organic group having from 3 to 22 carbon atoms, n is a number of from 1 to 50, m is a number from 0 to 10, OE represents the ethyleneoxy group, and OP represents the propoxyleneoxy group;
wherein the mole ratio of components A) and B) is from about 0.60:1 to about 2:1.

Signed and Sealed this

Twenty-eighth Day of March, 2006

JON W. DUDAS
*Director of the United States Patent and Trademark Office*